United States Patent
De Pauw et al.

(10) Patent No.: US 7,904,457 B2
(45) Date of Patent: Mar. 8, 2011

(54) SEMANTIC CORRELATION FOR FLOW ANALYSIS IN MESSAGING SYSTEMS

(75) Inventors: Wim De Pauw, Scarborough, NY (US); Robert L. Hoch, Wilton, CT (US); Yi Huang, Bloomington, IN (US)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 11/755,243

(22) Filed: May 30, 2007

(65) Prior Publication Data

US 2008/0301136 A1 Dec. 4, 2008

(51) Int. Cl.
- G06F 7/00 (2006.01)
- G06F 17/30 (2006.01)
- G06F 15/16 (2006.01)

(52) U.S. Cl. .................... 707/739; 707/804; 709/224

(58) Field of Classification Search .............. 707/739, 707/804; 709/224
See application file for complete search history.

(56) References Cited

U.S. PATENT DOCUMENTS

| | | | |
|---|---|---|---|
| 6,463,470 B1* | 10/2002 | Mohaban et al. | 709/223 |
| 2001/0052087 A1 | 12/2001 | Garg et al. | |
| 2003/0084148 A1 | 5/2003 | Cousins et al. | |
| 2004/0034795 A1* | 2/2004 | Anderson et al. | 709/224 |
| 2004/0181523 A1* | 9/2004 | Jardin | 707/3 |
| 2005/0021745 A1 | 1/2005 | Bookman et al. | |
| 2006/0168207 A1* | 7/2006 | Choong et al. | 709/224 |
| 2006/0173957 A1 | 8/2006 | Robinson et al. | |
| 2006/0277288 A1 | 12/2006 | Kelly et al. | |
| 2007/0189159 A1* | 8/2007 | Gerdes et al. | 370/230 |

OTHER PUBLICATIONS

Paul Lane and Viv Schupmann. Oracle 9i Data Warehousing Guide, Release 2 (9.2). Part A96520-01, Oracle Corporation, Title Pages, Chapter 6 and the Glossary, pp. i, ii, 6-1-6-10 and Glossary-1-Glossary-14. Mar. 2002.*
Wim De Pauw, Robert Hoch, Yi Huang. Discovering Conversations in Web Services Using Semantic Correlation Analysis. Proceedings of the 2007 IEEE International Conference on Web Services (ICWS 2007), IEEE Computer Society 2007, Jul. 9-13, 2007, Salt Lake City, Utah, USA. pp. 639-646.*
E. Rahm et al., "A Survey of Approaches to Automatic Schema Matching," VLDB Journal, DOI, 2001, pp. 334-350, vol. 10.
P. Brown et al., "Toward Automated Large-Scale Information Integration and Discovery," Data Management in a Connected World, 2005, pp. 161-180, Berlin.
P.A. Bernstein et al., "Industrial-Strength Schema Matching," ACM SIGMOD Record, Dec. 2004, pp. 38-43, vol. 33, No. 4.
P. Barham et al., "Using Magpie for Request Extraction and Workload Modelling," 6th Symposium on Operating Systems Design and Implementation (OSDI), 2004, pp. 259-272.

(Continued)

*Primary Examiner* — Greta L Robinson
*Assistant Examiner* — Brian E Weinrich
(74) *Attorney, Agent, or Firm* — Anne V. Dougherty, Esq.; Ryan, Mason & Lewis, LLP

(57) ABSTRACT

Improved techniques for flow analysis in messaging systems are disclosed. For example, a method for finding correlations between messages of a system based on content includes the following steps. For one or more executions of the system, obtaining the messages of the system, wherein each message has a schema associated therewith. The messages are categorized into groups, wherein each group has a common schema. Pairs of messages from disparate groups are found wherein, for the messages of a pair, there is a feature in common in their contents.

20 Claims, 7 Drawing Sheets

OTHER PUBLICATIONS

M.Y. Chen et al., "Path-Based Failure and Evolution Management," Proceedings of NSDI, 2004, 14 pages.

M.K. Aguilera et al., "Performance Debugging for Distributed Systems of Black Boxes," Procs. of the 19th ACM Symposium on Operating Systems Principles (SOSP), Oct. 2003, 16 pages, New York.

W.M.P. Van Der Aalst et al., "Workflow Mining: A Survey of Issues and Approaches," Data and Knowledge Engineering, 2003, pp. 237-267, vol. 47.

J.E. Cook et al., "Discovering Models of Software Processes from Event-Based Data," ACM Transactions of Software Engineering and Methodology (TOSEM), Jul. 1998, pp. 215-249, vol. 7, No. 3.

R. Agrawal et al., "Mining Process Models from Workflow Logs," Proc. of the Intl. Conf. on Extending Database Technology (EDBT), 1998, 15 pages.

C. Bernardeschi et al., "Using Process Algebras for the Semantic Analysis of Data Flow Networks," IEICE Transactions on Information and Systems, 1995, pp. 1-9.

W. Scheirer et al., "Network Intrusion Detection with Semantics-Aware Capability," 20th International Parallel and Distributed Processing Symposium (IPDPS), Apr. 2006, 7 pages.

S. Bhonsle et al., "Database-Centered Architecture for Traffic Incident Detection, Management and Analysis," IEEE Intelligent Transportation Systems Conference Proceedings, Oct. 2000, pp. 149-154, Michigan.

A. Munnich, "PRED-DF-A Data Flow Based Semantic Concurrency Control Protocol for Real-Time Main-Memory Database Systems," Real-Time Computing Systems and Applications, Proc. 7th International Conference, Dec. 2000, pp. 468-472.

Q.G. Zhao et al., "Data Streaming Algorithms for Accurate and Efficient Measurement of Traffic and Flow Matrices," Proc. of the ACM SIGMETRICS International Conference on Measurement and Modeling of Computer Systems, Jun. 2005, pp. 350-361, vol. 33, Issue 1, Canada.

A. Lakhina et al., "Structural Analysis of Network Traffic Flows," Proc. of the ACM SIGMETRICS Joint International Conference on Measurement and Modeling of Computer Systems, Jun. 2004, pp. 61-72, vol. 32, Issue 1, New York.

S. Sarvotham et al., "Connection-Level Analysis and Modeling of Network Traffic," Proc. of the 1st ACM SIGCOMM Workshop on Internet Measurement (IMW), Nov. 2001, pp. 99-103, California.

F. Curbera et al., "The Next Step in Web Services," Communications of the ACM, Oct. 2003, pp. 29-34, vol. 46, No. 10.

M. Gudgin et al., "Web Services Addressing 1.0—Core," W3C Recommendation 9, May 2006, http://www.w3.org/TR/ws-addr-core/, 19 pages.

"Application Response Measurement (ARM)," Technical Standard, Issue 4.0, Version 2—Java Binding, http://www.opengroup.org/tech/management/arm/, 96 pages.

"Application Response Measurement (ARM)," Technical Standard, Issue 4.0, Version 2—C Binding, http://www.opengroup.org/tech/management/arm/, 130 pages.

W. De Pauw et al., "Web Services Navigator: Visualizing the Execution of Web Services," IBM Systems Journal, 2005, pp. 821-846, vol. 44, No. 4.

"Eclipse Test and Performance Tools Platform [TPTP] Project," http://www.eclipse.org/tptp/home/project_info/general/tptp_datasheet.pdf, 2 pages.

A. Brown et al., "Using Service-Oriented Architecture and Component-Based Development to Build Web Service Applications," http://www-128.ibm.com/developerworks/rational/library/510.html, 16 pages.

"RosettaNet Standards," http://portal.rosettanet.org/cms/sites/RosettaNet/Standards/RStandards/pip/index.html, 1 page.

M. Chapman et al., "Supply Chain Management Sample Application Architecture," Web Services Interoperability Organization, Dec. 2003, Version 1.01, 37 pages.

P. Reynolds et al., "WAP5: Black-Box Performance Debugging for Wide-Area Systems," Proceedings of the 15th International Conference on World Wide Web, May 2006, pp. 347-356.

W. De Pauw et al., "Execution Patterns for Visualizing Web Services," Proceedings of the 2006 ACM Symposium on Software Visualization, 2006, pp. 37-45.

* cited by examiner

Table 1. Value table for orderBook

| Msg | Cat. | Title | Author | Address | ZIP | State | Order N | Discount |
|---|---|---|---|---|---|---|---|---|
| 1 | books | The World i... | Thomas L. | 19 Skyline.. | 10532 | NY | 775002 | AAA, R4,. |
| 2 | CD | Eyes Open | Snow Patrol | 19 Skyline.. | 10532 | NY | 342123 | Q3 |
| 3 | CD | My Culture | 1 Giant Leap | 2 Main Str.. | 10562 | NY | 543667 | |
| 4 | DVD | Himmel übe... | Wim Wenders | 54 Jones.. | 94133 | CA | 564356 | AAA, RW |

SEMANTIC CORRELATION FOR FLOW ANALYSIS IN MESSAGING SYSTEMS

FIELD OF THE INVENTION

The present application relates to messaging systems and, more particularly, to semantic correlation techniques for flow analysis in such messaging systems.

BACKGROUND OF THE INVENTION

A simple user-facing application, such as a stock-quote application or a bank-balance inquiry application, invokes a service and waits on the response. The network or the middleware layer ensures that the response returns to the invoking client. Multiple requests from a client usually happen in a synchronous fashion. As a result, the behavior of these applications can be observed by following the sequence of messages that make up the control flow. This model can be extended to cover business logic executing in a middleware environment as long as it holds to the limitation of executing a session in a single thread. As used herein, application-based systems that exchange messages between modules or components are generally referred to as "messaging systems."

However, more complex business functions are often constructed in a more loosely coupled fashion. This may mean that requests are submitted to modules of the application without waiting on an immediate response. Responsibility for a process may be handed off from one module of the application to another, or to an entirely different application. We refer to applications of this type as composite business applications. Further, we use the term "conversation" to refer to a sequence of messages that is related to a particular goal, for example, a business goal.

Where a simple application waits for the completion of a request before continuing, a request in a composite business application may be executed asynchronously, relying on a call-back mechanism or polling in order to determine its eventual outcome. This more complex pattern of interaction places a greater burden on the application modules to keep track of the state of multiple conversations and to route a message to its correct destination. It is common practice to include application specific data in the messages that are exchanged so that they can carry necessary context from one module to another. The context data may include a data element that serves as a conversation identifier for the application modules that are involved. Recent standards such as WS-addressing (M. Gudgin et al., "Web Services Addressing 1.0—Core" available from: http://www.w3.org/TR/ws-addr-core/) proposes to let business application developers delegate this task to the middleware level rather than crafting application-specific solutions. Yet, for most existing applications and for composite business applications that span multiple domains of control, the current practice of using application-specific conversation identifiers continues to be in effect.

The increasing complexity of business applications poses new challenges for understanding application behavior and requires new tools for problem determination. In the absence of standards-based approaches such as WS-addressing, it may be difficult to discover conversation identifiers from trace information, especially without the help of the original developer or documentation.

Traditional correlation mechanisms such as ARM ("Application Response Measurement" available from: http://www.open group.org/tech/management/arm/) provide an API (Application Programming Interface) that the application can call to record control flow in a distributed environment. Tools such as the Web Services Navigator (W. De Pauw et al., "Web Services Navigator: Visualizing the Execution of Web Services," IBM Systems Journal, Vol. 44, pp. 821-846, 2005) or the Eclipse Test & Performance Tools Platform (TPTP) ("The Eclipse Test & Performance Tools Platform," Available from: http://www.eclipse.org/tptp/) visualize the control flow of messages in composite applications. However, such tools can only combine messages that appear in a direct calling sequence and fail to combine groups of messages that constitute business process conversations. For example, one application may put the result of a transaction in a database, so that it can be picked up by another application. In traditional tools, this would show up as an interruption in the control flow where the information is temporarily stored in the database.

Accordingly, what is needed is an improved technique for flow analysis in messaging systems.

SUMMARY OF THE INVENTION

Principles of the invention provide improved techniques for flow analysis in messaging systems.

For example, in one aspect of the invention, a method for finding correlations between messages of a system based on content includes the following steps. For one or more executions of the system, obtaining the messages of the system, wherein each message has a schema associated therewith. The messages are categorized into groups, wherein each group has a common schema. Pairs of messages from disparate groups are found wherein, for the messages of a pair, there is a feature in common in their contents.

The schema may be the message structure derived from the messages. The system may be a distributed system. The method may further include discarding duplicates of the obtained messages. Pairs of the pairs of messages may also be discarded when the messages of a pair are separated from each other in time by an unacceptable amount of time.

The common feature may be found in a path in a schema for which an indexability value is higher than a given ratio (e.g., 0.9). The indexability value may be the cardinality of a set of values of the path divided by the number of data elements of the path.

The common feature may be found in a path in a schema for which an indexability value is approximately equal to one.

When two schemas share a common feature found in a path which has an indexability value approximately equal to one, they may be labeled as having a one-to-one relationship.

The common feature of a first schema may be found in a path with an indexability value that is approximately equal to one, and the common feature of a second schema may be an indexability value that is higher than a given ratio (e.g., a relatively low ratio, say 20%).

The common feature of a first schema may be found in a path with an indexability value that is approximately equal to one, and the common feature of a second schema may be found in a path for which no value occurs more than a fixed number of times (e.g., 10). Further, the common feature may be found in a combination of multiple paths.

The method may farther include determining a causal direction between a first schema and a second schema having a common feature, wherein the causal direction flows from the schema having messages with earlier timestamps as compared with timestamps of the corresponding messages of the other schema.

The common feature of the second schema may be found in a path with an indexability value that is between a given range (e.g., 20% to 80%) and which is labeled as a one-to-many relationship when the causal direction goes from the first schema to the second schema, or which is labeled as a many-to-one relationship when the causal direction goes from the second schema to the first schema.

The common feature of the second schema may be found in a path with an indexability value that is below a certain range (e.g., a range below 80% to some minimum percentage) and which is labeled as one-to-many relationship when the causal direction goes from the first schema to the schema, or which is labeled as a many-to-one relationship when the causal direction goes from the second schema to the first schema.

The pair finding step of the method may further include matching feature pairs such that there is a lexical similarity in a name of types of the respective paths.

The categorizing step of the method may further include categorizing a path as a simple type, with one occurrence of a feature in a message, or as an aggregate type, with multiple occurrences of a feature in a message. A population of an aggregate type may be counted as a total number of elements of this type across all messages in the schema.

The method may also include establishing a signature for schema pairs identifying them as one-to-one, one-to-many, many-to-one based on the feature pairs. The signature for schema pairs may be based on a prioritization over multiple feature pairs where one-to-one has precedence over one-to-many or many-to-one. Further, the signature for schema pairs may be based on a prioritization over multiple feature pairs based on a strength of lexical match between feature labels. A sample of messages may be used to establish signatures for analysis of a full set of messages. Further, a sample of messages may be used to establish signatures for analysis of a future set of messages. Still further, an established signature may be used to detect exceptions in a future set of messages. A sequence of three or more of messages can be related based on schema signatures, resulting in message patterns. A message pattern can be identified such that an intermediate pattern provides translation between one feature path, shared with a preceding message, and a second feature path shared with a subsequent message.

Messages obtained by the method may be produced by machines to exchange information that is part of a workflow process. Messages may be email messages or other types of messages.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

While illustrative embodiments of the invention will be described herein from the perspective of composite business applications and a corresponding messaging system, it is to be understood that principles of the invention are not limited to use with any particular application or messaging system. Rather, principles of the invention are more generally applicable to any application and messaging system in which it would be desirable to provide improved flow analysis.

As will be illustratively described in the embodiments below, principles of the invention provide a mechanism for understanding the overall behavior and information flow of a composite application by identifying the conversation identifiers in the content of the messages. We use the phrase "semantic correlation" to describe how these content-based identifiers correlate messages across different threads of execution. Moreover, the inventive approach treats the modules of a composite application as black boxes, relying only on capturing the content of messages passed between the modules. Thus, the problem of expensive instrumentation inside internal components is avoided.

More particularly, principles of the invention provide an automated analysis methodology for discovering the conversation identifiers in a set of traced messages. The methodology allows us to reassemble sessions and conversations in a composite application. The results from this analysis provide the basis for an interactive visualization of the run-time behavior of a composite application.

In the illustrative embodiments to be described below, we assume a composite business applications domain integrated through the use of Service Oriented Architecture (SOA) technologies, in particular those using Web Services to communicate among application modules (A. Brown et al., "Using Service-Oriented Architecture and Component-Based Development to Build Web Service Applications," available from http://www-128.ibm.com/developerworks/rational/library/510.html). As such, we assume that application messages have a structure that can be determined from the content of the messages.

The inventive methodology relies on the content of the messages in order to find conversation identifiers. It is general enough to find the standard conversation identifiers used in WS-addressing headers, as well as ad-hoc approaches where a conversation identifier is passed inside the message. Since the methodology uses some simple statistics based on the content of the messages, we assume that we have trace information for a significant number of interactions. In our experiments, we processed traces ranging in size between 20 and 3300 messages.

Figure 1:
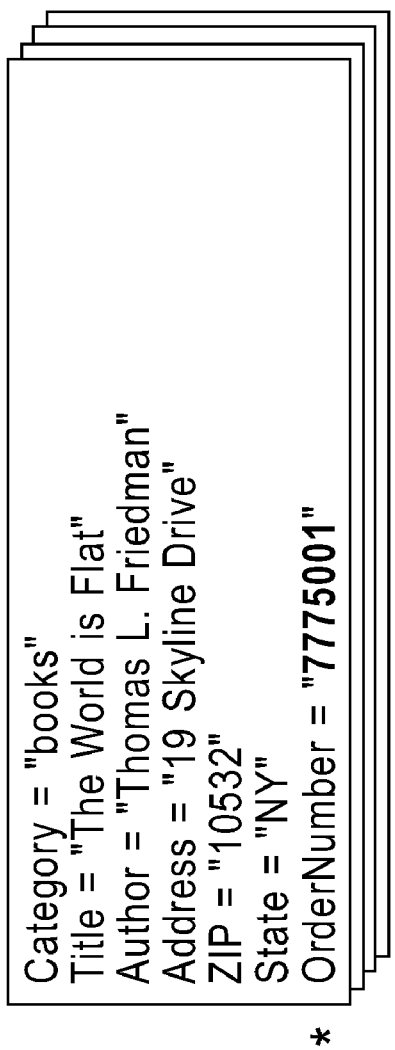
FIG. 1 illustrates a first set of messages for use in illustrating flow analysis according to an embodiment of the invention.

Let us illustrate a key idea behind the inventive methodology with a simple example. FIG. 1 shows a set of 100 traced messages of the orderbook operation. The figure shows the structure and content for the first message of the set. We assume that the same structure applies to all these messages. We also show the number of unique values or the cardinality for each data field for this example. We first find the fields that can be unique identifiers. These are the fields in the messages that have a unique value for each message. Given a large enough number of messages, we can expect Title or ZIP not to be unique. OrderNumber (denoted by an asterisk), on the other hand, has as many different values as there are messages. Therefore, OrderNumber can serve as a unique identifier for this set of traced orderBook messages.

Figure 2:
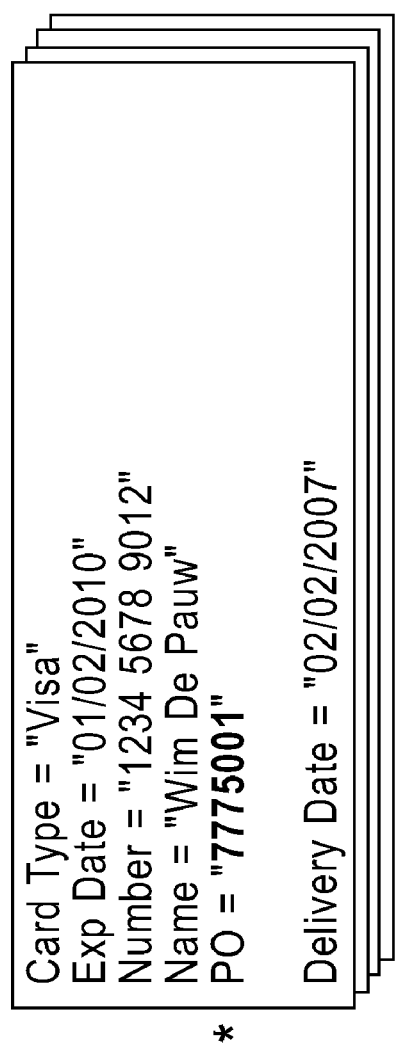
FIG. 2 illustrates a second set of messages for use in illustrating flow analysis according to an embodiment of the invention.

Let us now consider a second set of messages, shipBook, as depicted in FIG. 2. Suppose we find a unique identifier PO (denoted by an asterisk) for this set. If, in addition, there is a significant match between the values of OrderNumber from the first set and the values of PO in the second set, we have identified a semantic correlation between OrderNumber and PO.

Figure 3:
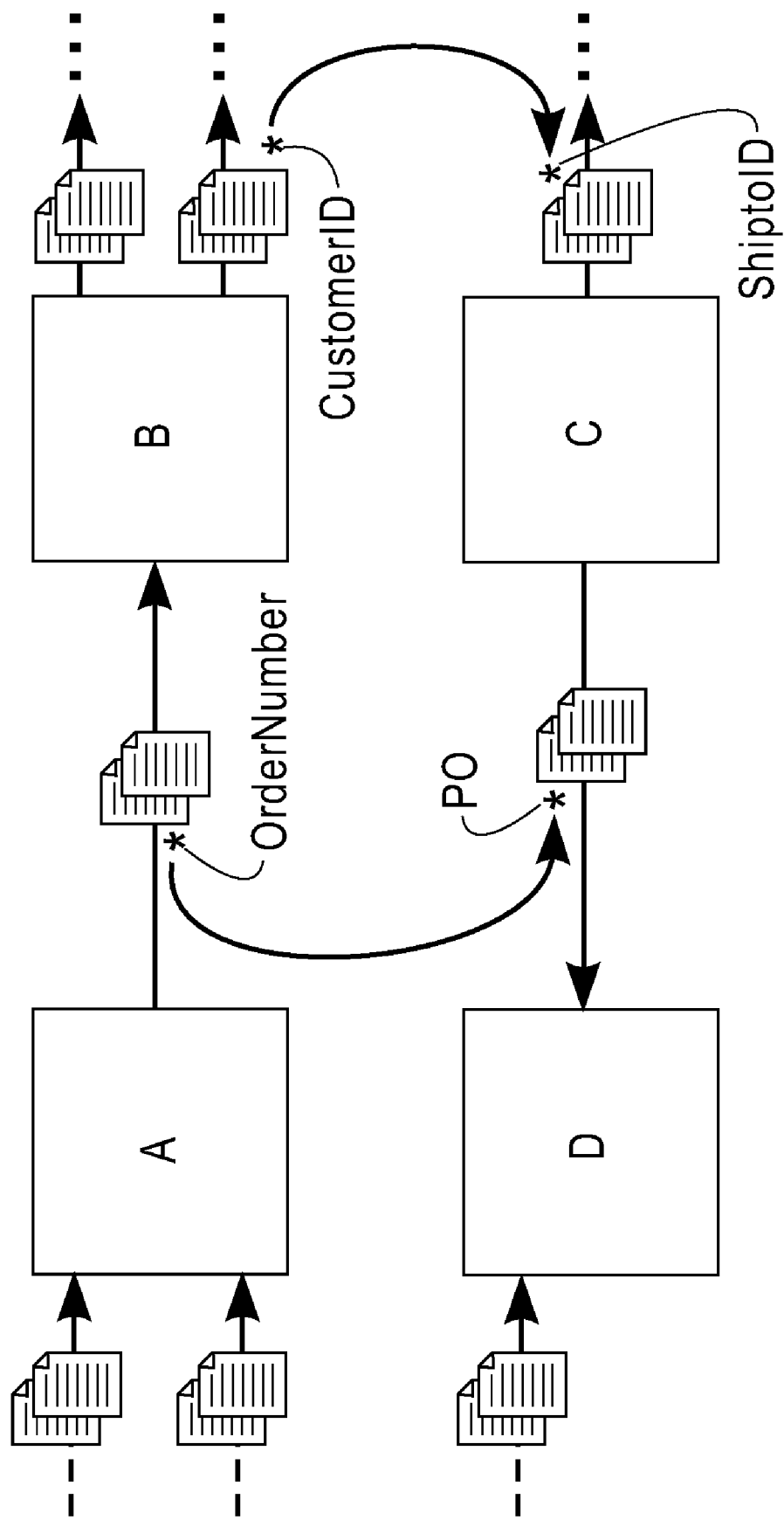
FIG. 3 illustrates a multiple service point configuration wherein two semantic correlations are identified according to an embodiment of the invention.

When we look at these messages in the context of a larger application, we can see how the semantic correlations can link together multiple control flows. The example in FIG. 3 shows a configuration with multiple service points (four of them are depicted as boxes A, B, C, and D). The straight (dashed) arrows indicate the control flow between the service points, gathered with traditional correlation techniques. As suggested in this figure, they only tell us part of the story.

Imagine that we found four data fields with unique values, which are therefore candidate correlation identifiers: OrderNumber, PO, CustomerID and ShiptoID. Similar to OrderNumber and PO, we might also see a match between the values of CustomerID and ShiptoID. Both matches correspond to two distinct semantic correlations, shown in FIG. 3 by the curved (solid) arrows between their respective identifiers.

In the case of the semantic correlation between the orderBook and shipBook messages, their respective data fields, OrderNumber and PO, may now serve as correlation identifiers for conversations that include orderbook and shipBook messages. We can learn more about the causal order between these messages if we look at their respective timestamps. If the timestamp of every orderBook message was earlier than the matching shipBook message, we can infer that in this conversation, orderBook was the cause and shipBook the effect. This causality is shown in FIG. 3 by the direction of the curved (solid) arrows.

In this example, there is a one-to-one relationship between the values in OrderNumber and the values in PO. We have extended the methodology to also find interesting one-to-many and many-to-one semantic correlations between messages. Imagine in our previous example that the ordering of a book, depending on its availability, is followed by one or more of shippingStatus messages (not shown in FIG. 3). As a result, there may be one or more shippingStatus messages with OrderId=7775001, the equivalent of OrderNumber in orderBook. This implies that OrderId in shippingStatus is not a unique identifier anymore and that there is no longer a perfect one-to-one match. Nevertheless, cases like this, where only one of the two message schemas has a path with unique values (like OrderNumber), may still reveal interesting patterns. The analysis in this case can discover that an orderBook message results in one or more shippingStatus messages. Conversely, if the same OrderNumber was used for multiple books in the same shipping order, we could show a many-to-one relationship.

Accordingly, a methodology for finding correlations between messages of a system based on content may be generally understood to include recording system messages, categorizing the messages in groups with a common schema, wherein a schema is a message structure derived from multiple messages. Then, pairs of messages are identified from disparate groups for which, in the messages, there is a common feature in their contents. A feature is a pattern of similarity between data fields of messages, examples of which are described below.

Figure 4:
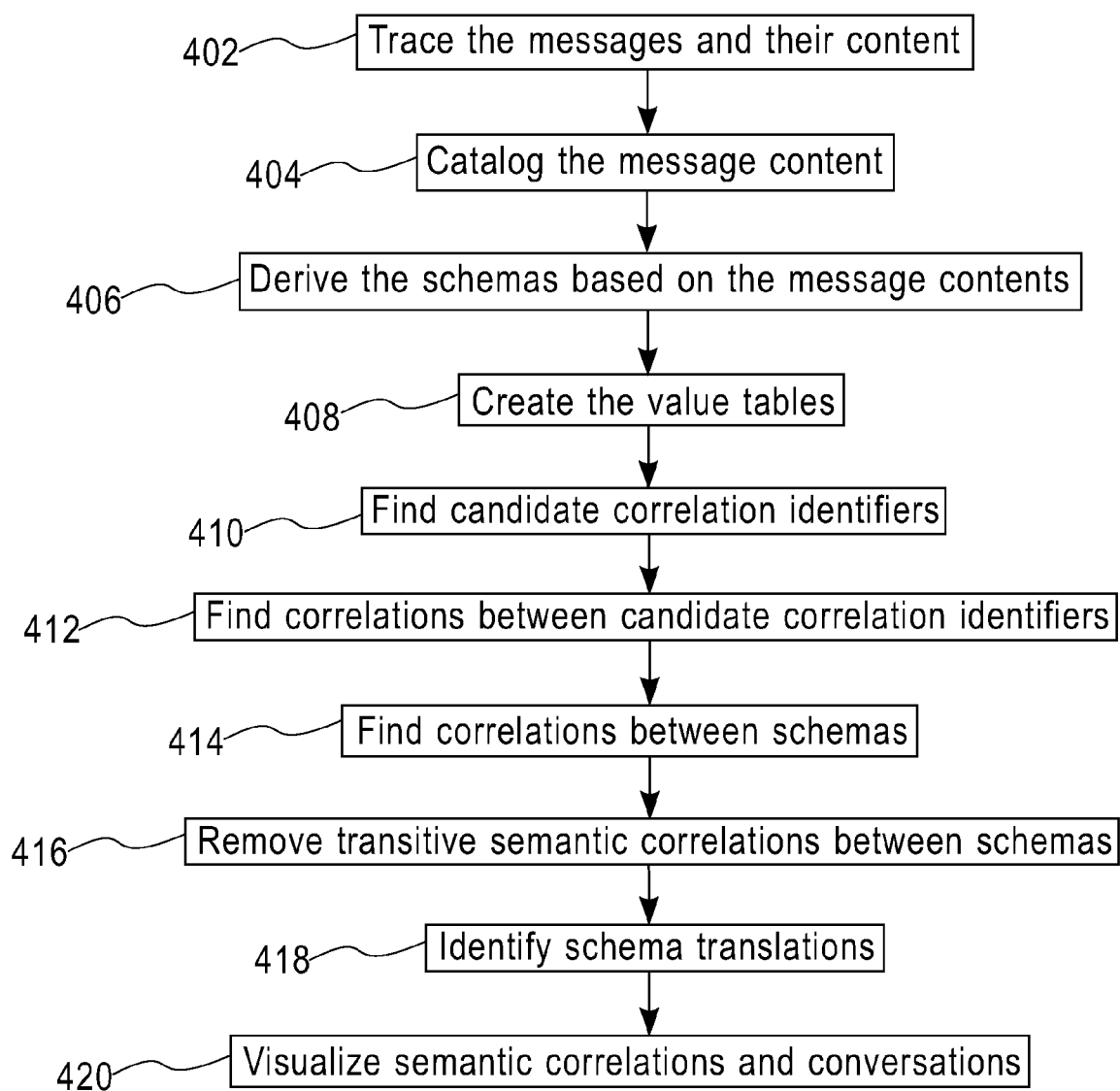
FIG. 4 illustrates a methodology for discovering conversation identifiers and semantic correlations according to an embodiment of the invention.

We now describe an illustrative embodiment of such a methodology for discovering conversation identifiers and semantic correlations. FIG. 4 illustrates the steps of the methodology. It is to be understood that while methodology 400 of FIG. 4 depicts steps 402 through 420 in a sequential order, one or more of the steps can be performed in an order other than that depicted.

A. Tracing the Messages and Their Content (Step 402)

The methodology first collects (records) all the messages that are sent between the services under study, including their contents and timestamps. This can be realized with existing technology such as the Web Services Navigator (W. DePauw et al., "Web Services Navigator: Visualizing the Execution of Web Services," IBM Systems Journal, Vol. 44, pp. 821-846, 2005, the disclosure of which is incorporated by reference herein). However, it is to be understood that other suitable tools may be employed.

B. Cataloging the Message Content (Step 404)

Starting from a set of traces of all messages, the methodology then builds a catalog of these messages partitioned by message type. In the case of a distributed system using Web Services, the messages are encoded in XML (Extensible Markup Language) and can be grouped by their full message name. In other cases, such as messaging systems, additional metadata like the message channel may be used to partition the messages by message type.

C. Deriving the Schemas Based on the Message Contents (Step 406)

For each group of messages with the same message name in the partition, the methodology derives a schema based on the content of the messages. In the case of XML, a schema can be derived from the XML paths present in the messages. We will use the term "path" to refer to the location of an element or attribute starting from the root of the XML document. We are only concerned with elements and attributes that have content.

D. Creating the Value Tables (Step 408)

Figures 5, 6:
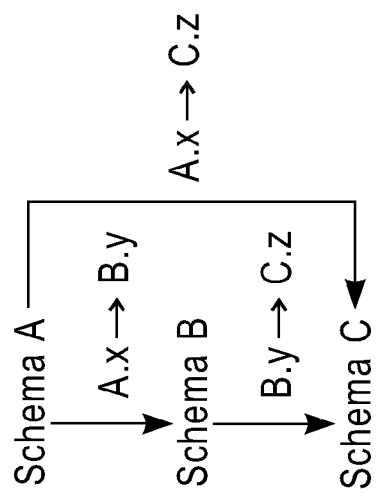
FIG. 5 illustrates a value table for each schema and its associated messages according to an embodiment of the invention.
FIG. 6 illustrates transitive semantic correlations according to an embodiment of the invention.

The methodology then creates a value table for each schema and its associated messages. FIG. 5 illustrates such a value table (table 1). In a value table, each row represents a message and each column represents a path of the schema. The methodology now populates each entry in the table with one, multiple or zero data elements for the corresponding message and path, corresponding to the following cases:

one data element there is a single data element for the path in the message; for example most cells in table 1 contain one value.

multiple data elements: there are multiple or composite elements for the path in the message; this may correspond to multiple line items in a document, each having the same path, or to an array in a Java data structure; for example, in table 1, message 1 has multiple elements (AAA, R4, . . . ) in the Discount path.

zero data elements: no data element for the path exists in the message; for example, message 3 does not contain any element in the Discount path.

In our experiments using reference applications, we noticed that a message was sometimes resent with the same content. For example, inquiry functions in the system can generate indistinguishable messages. In cases where we collected multiple messages with identical content, we used the first occurrence and discarded the rest. Since analysis is based on content, this is a reasonable approach.

E. Finding Candidate Correlation Identifiers (Step 410)

In this step, the methodology determines which paths in the value tables are good candidates for correlation identifiers. As mentioned above, we are interested in pairs of paths that may result in an interesting match. At least one path should have unique values and the second path should have either a set of unique values, or a large enough number of different values. For example, a path with just Boolean values is unlikely to have a meaningful mapping with another path.

For each path p in a schema value table, we take into account two statistics. The first is the total number of data elements or the population for p, $Pop_p$. Notice that $Pop_p$ can be higher than the number of messages, if this path has entries in its value table with multiple data elements. For example, the path Discount in table 1 is likely to have a $Pop_p$ that is larger than the number of messages or rows in its table. The second statistic is the total number of different values in p or the cardinality of its value set, $Card_p$. Here again, multiple data elements for this path in its value table may produce a cardinality that is higher than the number of messages containing this path. We only consider paths with a large enough number of values, e.g., $Card_p > 2$, screening out frequently occurring, but meaningless, mappings. We now define the indexability $\alpha_p$ of a path p as:

$$\alpha_p = \frac{Card_p}{Pop_p}$$

For example, a path is 100% indexable if each of its data elements has a unique value.

We then define and identify:

1. Highly indexable paths: These are paths with an indexability equal or close to 1.0, e.g. $\alpha_p > 0.95$. Allowing a small deviation from 1.0 can identify correlations in cases where there is some noise in the data, such as near duplicate messages.

2. Mappable paths: Our goal is to find paths that may have an interesting value match with another, highly indexable path. There are multiple ways to achieve this, and we realized this condition by allowing paths for which none of its values occurs more than $\gamma_{max}$ times in all of its data elements. For example, a threshold $\gamma_{max}=10$ will prevent that more than 10 data elements in this path with the same value will be matched to a single data element in another highly indexable path. By this definition, a highly indexable path is normally also a mappable path.

This step significantly narrows down the number of paths that are candidate correlation identifiers and restricts the number of comparisons between value sets of paths later on.

F. Finding Correlations Between Candidate Correlation Identifiers (Step 412)

Now that the methodology has identified the highly indexable and mappable paths in the schemas which will be candidate correlation identifiers, the methodology tries to find pairs of these paths that produce a significant match between their value sets. The following steps will identify path pairs with interesting semantic correlations.

1. First find all the pairs of paths between any two schemas for which: the first path is highly indexable, and the second path is mappable, and a significant overlap exists between the value sets of the first path and the second path.

2. For each such pair of paths found in (1), match up the individual data elements of the first and the second path. Then assign a causal direction between the two paths based on the timestamps of their respective messages so that we have an origin path and a destination path. We expect to find the timestamps of the messages from the origin path to be all uniformly earlier then the corresponding timestamps in the destination path. If we find conflicting directions beyond the margin of clock accuracy, the path pair may be discarded. Optionally, the pair of paths may be discarded (automatically or after user input) if the number of values found in the origin path is smaller than the number of values in the destination path. Such an observation would violate the concept of causality since we do not expect any new values to appear in the destination path that were not already in the origin path.

3. Each pair of paths found in step (2) can now be categorized as a semantic correlation of the following type:

one-to-one: if both the origin and destination paths are highly indexable;

one-to-many: if the origin path is highly indexable and the destination path is mappable;

many-to-one: if the origin path is mappable and the destination path is highly indexable.

In the context of a business process, this information can reveal: if a given cause has exactly one effect, like the orderBook.OrderNumber→shipBook.PO example above; if one cause has many effects; or if many causes have one effect. We consider a one-to-one semantic correlation stronger than a one-to-many or many-to-one because the value match conditions are more stringent. Notice that this classification of semantic path correlations is orthogonal to the presence of multiple data elements in any of the paths.

After these steps, the methodology has discovered the semantic correlations between paths. It tells us which correlation identifiers may be used by the composite application as a common context between different, possibly asynchronous sessions.

G. Finding Correlations Between Schemas (Step 414)

After finding correlations between paths from different schemas, the methodology can now define a correlation between two schemas if at least one path correlation exists between the schemas. It is possible that more than one path correlation exists between two schemas. Therefore, we define the semantic correlation type between schemas to be the strongest semantic correlation type of its path correlations. This means that if there is at least one one-to-one path correlation, the schema correlation type will also be one-to-one. The causal direction of a schema correlation is determined by the causal direction from its path correlations.

H. Removing Transitive Semantic Correlations Between Schemas (Step 416)

Transitive semantic correlations may appear among three or more schemas, as shown in FIG. 6, ordered by causality. In the example shown, schema A (and its messages) is semantically correlated with schema B (and its messages) by a semantic path correlation A.x→B.y. Similarly, schemas B and C are semantically correlated by a semantic path correlation B.y→C.z, and schemas A and C are semantically correlated by a semantic path correlation A.x→C.z. For visualization purposes, we can assume that the latest correlation is redundant information. Therefore, we do not consider it for visualization and the methodology removes such transitive semantic correlations.

I. Identifying Schema Translations (Step 418)

Figure 7A:
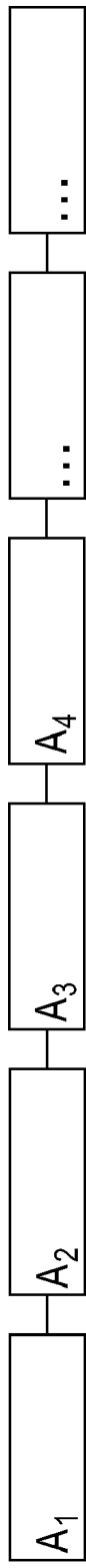
FIGS. 7A through 7C illustrate schema translation according to an embodiment of the invention.
Figure 7B:
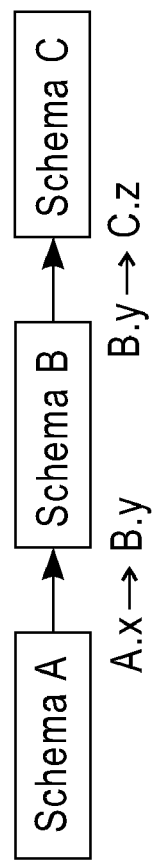
Figure 7C:
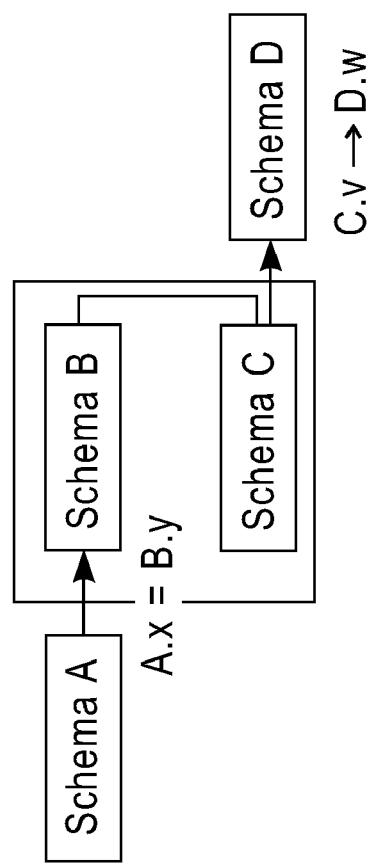

FIGS. 7A, 7B, and 7C illustrate this step. If so desired, this step of the methodology serves to identify points in a data flow where a schema translates from one data element to another, e.g., as in a data flow such as is depicted in FIG. 7A.

The step requires (as depicted in FIG. 7B) that:

Schema B contains two highly indexable paths, x and z; and

Each path participates in at least one semantic link.

We describe this as Schema B allows a translation from the value set in path x to the value set in path z. The fact that these paths are highly indexable means that for each $x_i$, there is at most one $z_i$.

In cases where there is typical correlation information available, e.g., using identifiers that tie together matching request and response messages, and/or messages that are part of a transaction, we can generalize the translation of indexing data elements within one schema to:

An invocation type, consisting of a request message type and its corresponding response message type. If we find a highly indexable path for the schema in the request type and one in the response type, and both have the same number of values, we have a pair of translated keys.

A transaction pattern, where a schema consistently occurs as a part of a recurring sequence of messages. Here, if y and v occur in separate messages within the same transaction patterns, we have a pair of translated paths.

Such a generalization of the schema translation step is depicted in FIG. 7C.

J. Visualizing Semantic Correlations and Conversations in a Business Process (Step 420)

If so desired, the methodology may then provide one or more visualizations of the semantic correlations and conversations of the subject process being evaluated. In an illustrative embodiment, we used the Web Services Navigator (referred to above in step 402) as a visualization environment to add new views showing semantic correlations, correlation identifiers and conversations in business processes. However, it is to be understood that other suitable tools may be employed. While the existing views in this tool used to show the execution of complex Web Services applications by focusing primarily on control flow, the new views generated in accordance with the techniques of the invention offer additional understanding into the data flow and the business conversations executed in composite applications.

We illustrate this visualization with an example of a purchasing application based on the supply chain business interactions defined by the RosettaNet consortium ("RosettaNet standards," available from: http://portal.rosettanet.org/cms/sites/RosettaNet/Standards/RStandards/pip/index.html). These interactions define the major steps required to move through the process of requesting quotes, placing purchase orders and fulfilling orders, notifying shipment delays and canceling orders.

Figure 8:
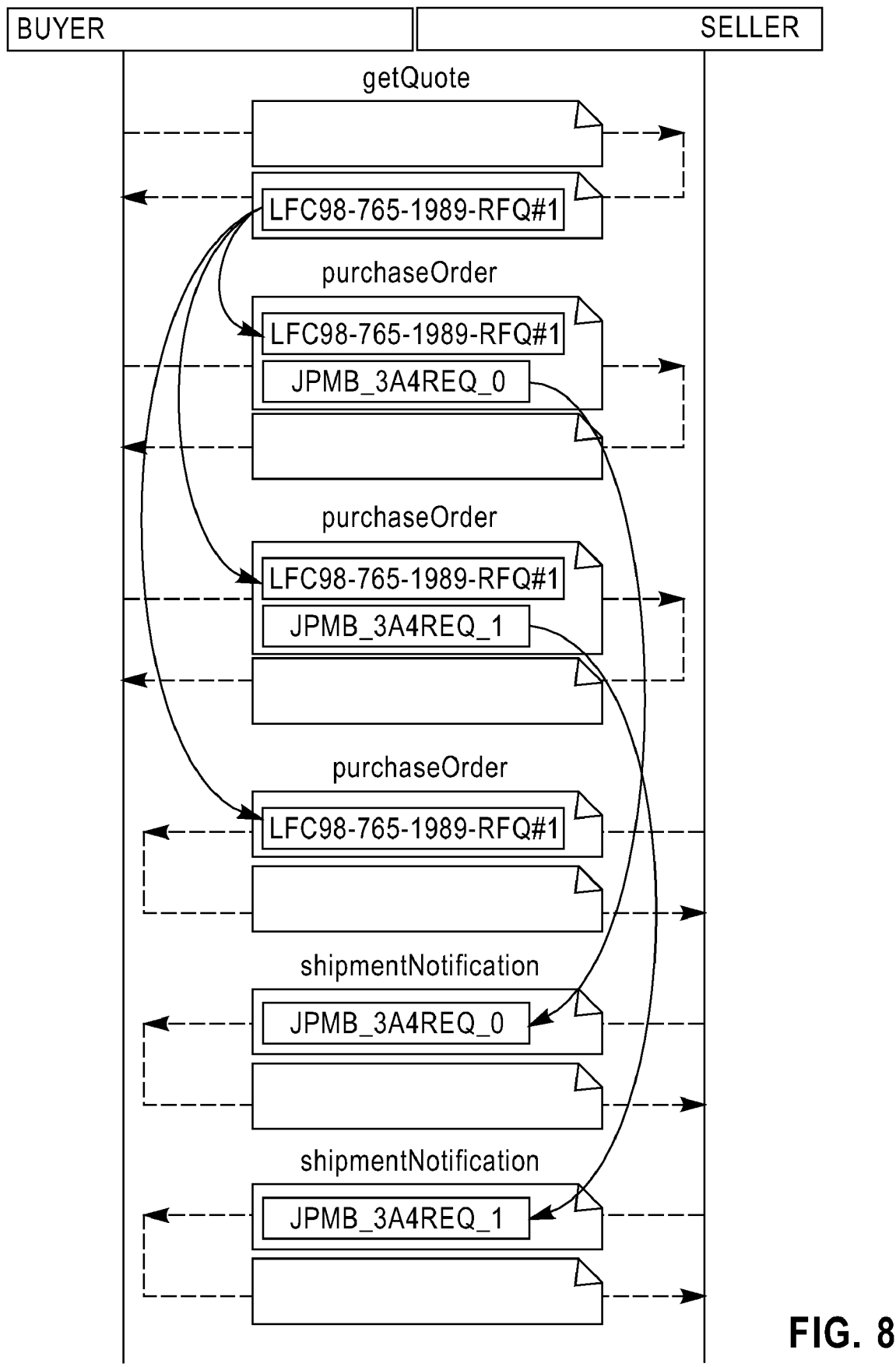
FIG. 8 illustrates part of a visualization of a purchasing application according to an embodiment of the invention.

FIG. 8 shows an excerpt of the execution of this application in a sequence diagram. The two columns represent the different business roles (parties), in this example BUYER and SELLER. Time proceeds in the vertical direction. Control flow is shown, as in most existing tools, as request/response invocations (drawn as horizontal dashed arrows) between the parties. In this example, we have one getQuote, three purchaseOrder and two shipmentNotification invocations. The getQuote and purchaseOrder invocations originate from the buyer, the shipmentNotification from the seller.

This information alone is insufficient to fully understand the conversation flow in this business application. Therefore, we add the results of our semantic correlation analysis. We draw the message contents for the requests and responses of the invocations as the lighter rectangles. The conversation identifiers are drawn inside as labels in darker rectangles. We also draw the semantic correlations as curved lines, connecting the conversation identifiers. This new visualization first reveals that the quote for merchandise items obtained in getQuote was used in a three subsequent purchaseOrders. This one-to-many semantic correlation is shown as the three curved arrows on the left, connecting the correlation identifiers in each instance. Then, it shows that two of the three purchaseOrders were followed by a shipmentNotification. These one-to-one semantic correlations are drawn as the two curved arrows on the right.

Now that we learned how these correlation identifiers put the previously disjoint invocations in context, we can better understand the conversations that occurred in this example. The buyer asks a quote from the seller, probably for several items. The seller responds and gives the buyer a quoteNumber, (LEC98 . . . ). The buyer then purchases, in three different transactions, three items from the quote list. For each of these transactions, the buyer mentions the quoteNumber for the item, to which the seller responds with an OrderNumber (JPMB . . . ). Whenever an order is ready, the seller sends a shipmentNotification to the buyer, mentioning the correct OrderNumber (JPMB . . . ).

More complex examples might include additional steps in the purchasing process as well as multiple instances of each role. For example a buyer may send out a request for quote to multiple sellers, and then place the order with the lowest-priced seller.

Figure 9:
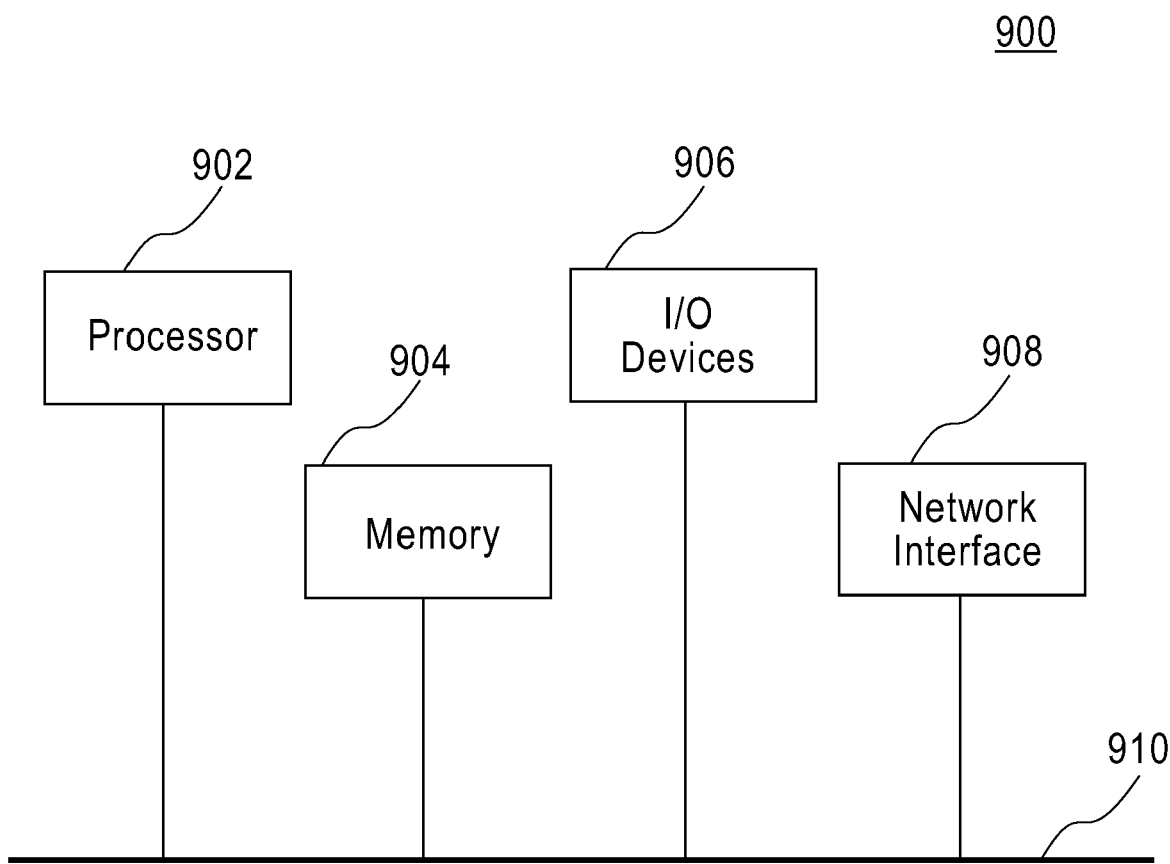
FIG. 9 illustrates a computer system wherein flow analysis techniques may be implemented according to an embodiment of the invention.

FIG. 9 illustrates a computer system wherein flow analysis techniques may be implemented according to an embodiment of the invention. That is, FIG. 9 illustrates a computer system in accordance with which one or more components/steps of the flow analysis techniques (e.g., components and methodologies described above in the context of FIGS. 1 through 8) may be implemented, according to an embodiment of the invention. It is to be understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 9 may represent one or more servers or one or more other processing devices capable of providing all or portions of the functions described herein.

As shown, computer system 900 includes processor 902, memory 904, input/output (I/O) devices 906, and network interface 908, coupled via a computer bus 910 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still farther, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

It is to be understood that while we have described techniques of the invention above in terms of Web Services, the same techniques can be applied to composite applications using other messaging systems where the messages have structured content. Advantageously, this permits the use of the inventive techniques for broader application in understanding legacy systems integrated through asynchronous messaging.

Various modifications and alterations to the above-described illustrative embodiments may be made in a straightforward manner. By way of example only, we can use a sliding time window for the comparison of sets of messages. The methodology could also benefit from interactive user input to resolve possible ambiguities or to let the user drill down to a particular piece of the execution. Using a combination of multiple data fields in one message as a correlation identifier (similar to compound keys in database design) would allow the user to discover a wider range of relationships.

If performance and scale become critical, we can split the methodology in a training phase and an execution phase: first, the training phase would extract the correlation identifiers from a limited, but representative training set; then, the execution phase can efficiently parse and correlate these identifiers across different messages. This could result in a substantial reduction in the amount of data collected from the messages and better performance at analysis time.

While the illustrative embodiments described above have shown only one type of visualization, different types of interactive visualizations may be used to reveal the correlations between instances of messages as well as patterns of correlations, analogous to execution patterns in Web Services. These visualizations include, but are not limited to, topology views as well as sequence diagrams.

Advantageously, techniques of the invention reveal conversations in workflow of composite applications, such as business processes. The techniques help developers and business owners to better understand how complex applications with multiple, concurrent, and possibly long lasting sessions, execute. Our semantic correlation complements, rather than replaces, traditional trace correlation methods. However, it provides a deeper understanding of the execution at a higher level of abstraction. The inventive techniques provide many advantages, by way of example only unique because:

The techniques can show data flow where control flow tracing leaves gaps.

The techniques do not require any design information of the system under study.

The techniques analyze the content of the messages exchanged between the service nodes and does not require expensive internal tracing.

The techniques of the invention can be applied to any kind of messaging system, as long as the content of its messages is structured and can be parsed. In fact, migrating legacy messaging systems to newer platforms may benefit from the insights gained with the inventive techniques.

Other advantages include, but are not limited to, the ability to: infer correlations of data in message flow of distributed applications; find hidden control/data flow between nodes in a messaging system; understand data flow in terms of fan-in/fan-out, composition, decomposition, etc.; find reply for a request in a callback structure; data flow analysis between black boxes; and detect the following patterns: routers, aggregators, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for finding correlations between messages of a system based on content, the method comprising the steps of:

obtaining for one or more executions of the system, the messages of the system, wherein each message has a schema associated therewith;

categorizing the messages into groups, wherein each group has a common schema; and finding pairs of messages from disparate groups wherein, for the messages of a pair, there is a feature in common in their contents;

wherein the common feature is found between different paths of different schemas of disparate message groups based at least in part on an indexability value of the different paths, wherein the indexability value is the cardinally of a set of values of a path divided by the number of data elements of the path, wherein a path is a location of an element or attribute in a schema.

2. The method of claim 1, where the common schema for each group of messages is the message structure derived from the messages of the group.

3. The method of claim 1, wherein the system is a distributed system.

4. The method of claim 1, further comprising the step of discarding duplicates of the obtained messages.

5. The method of claim 1, further comprising the step of discarding pairs of the pairs of messages when the messages of a pair are separated from each other in time by an unacceptable amount of time.

6. The method of claim 1, wherein the common feature is found in a path for which the indexability value of the path is higher than a given ratio.

7. The method of claim 1, wherein the common feature is in a path for which the indexability value of the path is approximately equal to one.

8. The method of claim 1, wherein a common feature of a first schema is found in a path with an indexability value that is approximately equal to one, and a common feature of a second schema has an indexability value that is higher than a given ratio.

9. The method of claim 1, wherein a common feature of a first schema is found in a path with an indexability value that is approximately equal to one, and a common feature of a second schema is found in a path for which no value occurs more than a fixed number of times.

10. The method of claim 1, wherein the common feature is found in a combination of multiple paths.

11. The method of claim 1, wherein the finding step further comprises matching feature pairs such that there is a lexical similarity in a name of types of the respective paths.

12. The method of claim 1, wherein the categorizing step further comprises categorizing a path as a simple type, with one occurrence of a feature in a message, or as an aggregate type, with multiple occurrences of a feature in a message.

13. A method for finding correlations between messages of a system based on content, the method comprising the steps of:
   obtaining for one or more executions of the system, the messages of the system, wherein each message has a schema associated therewith;
   categorizing the messages into groups, wherein each group has a common schema; and
   finding pairs of messages from disparate groups wherein, for the messages of a pair, there is a feature in common in their contents;
   wherein when two schemas share a common feature found in a path having an indexability value approximately equal to one, the two schemas are labeled as having a one-to-one relationship, wherein the indexability value is the cardinality of a set of values of the path divided by the number of data elements of the path, and wherein a path is a location of an element or attribute in the schema.

14. A method for finding correlations between messages of a system based on content, the method comprising the steps of:
   obtaining for one or more executions of the system, the messages of the system, wherein each message has a schema associated therewith;
   categorizing the messages into groups, wherein each group has a common schema;
   finding pairs of messages from disparate groups wherein, for the messages of a pair, there is a feature in common in their contents; and
   determining a causal direction between a first schema and a second schema having a common feature, wherein the causal direction flows from the schema having messages with earlier timestamps as compared with timestamps of the corresponding messages of the other schema.

15. The method of claim 14, wherein the common feature of the second schema is found in a path with an indexability value that is between a given range and which is labeled as a one-to-many relationship when the causal direction goes from the first schema to the second schema, or which is labeled as a many-to-one relationship when the causal direction goes from the second schema to the first schema, wherein a path is a location of an element or attribute in the schema.

16. A method for finding correlations between messages of a system based on content, the method comprising the steps of:
   obtaining for one or more executions of the system, the messages of the system, wherein each message has a schema associated therewith;
   categorizing the messages into groups, wherein each group has a common schema;
   finding pairs of messages from disparate groups wherein, for the messages of a pair, there is a feature in common in their contents; and
   establishing a signature for schema pairs identifying them as one-to-one, one-to-many, or many-to-one based on the feature pairs.

17. The method of claim 16, wherein the signature for schema pairs is based on a prioritization over multiple feature pairs: (i) where one-to-one has precedence over one-to-many or many-to-one; or (ii) based on a strength of lexical match between feature labels.

18. The method of claim 16, wherein a sample of messages is used to establish signatures for analysis of: (i) a full set of messages; or (ii) a future set of messages.

19. An apparatus for finding correlations between messages of a system based on content, comprising:
   a memory; and
   at least one processor coupled to the memory and configured to: (i) obtain for one or more executions of the system, the messages of the system, wherein each message has a schema associated therewith; (ii) categorize the messages into groups, wherein each group has a common schema; and (iii) find pairs of messages from disparate groups wherein, for the messages of a pair, there is a feature in common in their contents;
   wherein the common feature is found between different paths of different schemas of disparate message groups based at least in part on an indexability value of the different paths, wherein the indexability value is the cardinality of a set of values of a path divided by the number of data elements of the path,
   wherein a path is a location of an element or attribute in a schema.

20. A computer readable storage medium for finding correlations between messages of a system based on content, comprising one or more programs which when executed by a computer implement the steps of:
   obtaining for one or more executions of the system, the messages of the system, wherein each message has a schema associated therewith;
   categorizing the messages into groups, wherein each group has a common schema; and
   finding pairs of messages from disparate groups wherein, for the messages of a pair, there is a feature in common in their contents;
   wherein the common feature is found between different paths of different schemas of disparate message groups based at least in part on an indexability value of the different paths, wherein the indexability value is the cardinality of a set of values of a path divided by the number of data elements of the path,
   wherein a path is a location of an element or attribute in a schema.

* * * * *